(12) United States Patent
Zhan et al.

(10) Patent No.: US 11,165,364 B2
(45) Date of Patent: Nov. 2, 2021

(54) SYNCHRONOUS RECTIFIER FOR WIRELESS CHARGING SYSTEM

(71) Applicant: NXP B.V., Eindhoven (NL)

(72) Inventors: Fuchun Zhan, Shanghai (CN); Tinghua Yun, Changzhou (CN); Jian Qing, Shanghai (CN); Chao Chen, Shanghai (CN); Li Zhang, Shanghai (CN); Feng Cong, Shanghai (CN)

(73) Assignee: NXP B.V., Eindhoven (NL)

( * ) Notice: Subject to any disclaimer, the term of this patent is extended or adjusted under 35 U.S.C. 154(b) by 275 days.

(21) Appl. No.: 16/283,845

(22) Filed: Feb. 25, 2019

(65) Prior Publication Data

US 2020/0195164 A1    Jun. 18, 2020

(30) Foreign Application Priority Data

Dec. 13, 2018    (CN) .......................... 201811521216.7

(51) Int. Cl.
*H02J 7/00* (2006.01)
*H02M 7/219* (2006.01)
*H02J 7/02* (2016.01)
*H02M 1/08* (2006.01)
*H02M 1/00* (2006.01)

(52) U.S. Cl.
CPC ............. *H02M 7/219* (2013.01); *H02J 7/025* (2013.01); *H02M 1/08* (2013.01); *H02M 1/0012* (2021.05)

(58) Field of Classification Search
CPC .................................................... H02M 7/219
USPC ........................................................ 320/108
See application file for complete search history.

(56) References Cited

U.S. PATENT DOCUMENTS

| 7,492,614 | B2 * | 2/2009 | Furukoshi | ............... | H02M 1/32 363/21.01 |
| 8,670,219 | B2 | 3/2014 | Disney | | |
| 2012/0044723 | A1 * | 2/2012 | Lin | ................... | H02M 3/33507 363/21.13 |
| 2015/0263534 | A1 | 9/2015 | Lee et al. | | |
| 2016/0276945 | A1 * | 9/2016 | Yan | ................... | H02M 3/33592 |
| 2016/0294180 | A1 | 10/2016 | Pagano et al. | | |

(Continued)

OTHER PUBLICATIONS

Lin Cheng, Wing-Hung Ki, Yan Lu and Tak-Seng Yim, "Adaptive On/Off Delay-Compensated Active Rectifiers for Wireless Power Transfer Systems", IEEE Journal of Solid-State Circuits, vol. 51, No. 3, Mar. 2016.

(Continued)

*Primary Examiner* — Yalkew Fantu

(57) ABSTRACT

A synchronous rectifier converts an AC input into a DC output. The synchronous rectifier has four switches controlled by four switch control modules. Each switch is connected between a different AC component and either the DC output or ground. Each switch control module has digitally assisted "switch on" circuitry that detects "on" bounces in the corresponding AC component to control when to turn on the corresponding switch and digitally assisted "switch off" circuitry that detects "off" bounces in the AC component to control when to turn off the corresponding switch. The "switch on" circuitry has a digitally assisted comparator to detect threshold crossings in the AC component, and the "switch off" circuitry has a digitally assisted programmable delay cell to turn off the switch for a predetermined duration following each detected threshold crossing.

13 Claims, 9 Drawing Sheets

(56) References Cited

U.S. PATENT DOCUMENTS

2016/0344302 A1 11/2016 Inoue
2017/0040813 A1* 2/2017 Hu .............................. H02J 7/02
2017/0302193 A1* 10/2017 Zhang ..................... H02M 1/08

OTHER PUBLICATIONS

Huwig, Dominik et al., "Digitally Controlled Synchronous Bridge-Rectifier for Wireless Power Receivers", 28th Annual IEEE Applied Power Electronics Conference and Exposition, Mar. 17, 2013, pp. 2598-2603, IEEE, Piscataway, NJ, USA.

* cited by examiner

TABLE I: IDEAL OPERATION OF CONVENTIONAL SYNCHRONOUS RECTIFIER

| AC1 | AC2 | FET 204(1) | FET 204(2) | FET 204(3) | FET 204(4) |
|---|---|---|---|---|---|
| VRECT<AC1 | AC2<0 | OFF | ON | ON | OFF |
| 0<AC1<VRECT | 0<AC2<VRECT | OFF | OFF | OFF | OFF |
| AC1<0 | VRECT<AC2 | ON | OFF | OFF | ON |

500

SYNCHRONOUS RECTIFIER FOR WIRELESS CHARGING SYSTEM

BACKGROUND

The present invention relates generally to synchronous rectifiers and, more particularly, to synchronous rectifiers for wireless charging systems.

FIG. 1 is a simplified schematic block diagram of a conventional wireless charging system 100 having a power transmitter (TX) 110 and a power receiver (RX) 130. The TX 110 includes transmitter 112, TX matching network 114, and TX inductor coil 116, while the RX 130 includes RX inductor coil 132, RX matching network 134, synchronous rectifier 136, communication controller 138, and communication processor 140. The matching networks 114 and 134 are designed to ensure that the output impedance of the TX 110 matches the input impedance of the RX 130. The TX and RX inductor coils 116 and 132 form an inductive interface 120 for wirelessly (i.e., magnetically) transferring power from the TX 110 to the RX 130 and communications signals between the TX and RX.

For power transfer, the power transmitter 112 applies an AC power signal 113 to the TX inductor coil 116 via the TX matching network 114. The AC power signal 113 induces an AC power signal in the RX inductor coil 132, which is applied via the RX matching network 134 as AC power signal 135 to the rectifier 136. The rectifier 136 rectifies the AC power signal 135 into a DC power signal VRECT that is applied to a load.

The communication controller 138 generates communication signals that are transmitted by the communication processor 140 through the inductive interface 120 to the TX 110. In particular, the communication controller 138 monitors VRECT and, if appropriate, transmits communication signals using the inductive interface 120 to either increase or decrease the TX 110 the power transfer level if VRECT is either too low or too high, respectively. Those skilled in the art will understand that, in other wireless power transfer systems, the wireless power transfer path is separate and distinct from the wireless data communication path.

FIG. 2 is a schematic block diagram of a conventional synchronous rectifier 200 that can be used to implement the synchronous rectifier 136 of FIG. 1. As shown in FIG. 2, the synchronous rectifier 200 includes four comparators 202(1)-202(4) that control four n-type field-effect transistors (FETs) 204(1)-204(4) having respective intrinsic diodes. Capacitor 206 functions as a low-pass filter for the synchronous rectifier 200.

The AC signal applied to the synchronous rectifier 200 has two complementary components AC1 and AC2 that vary in voltage from one diode voltage drop below zero (i.e., ground PGND in FIG. 2) to one diode voltage drop above VRECT, where ideally AC1+AC2=VRECT. Note that there could be some phase shift between AC1 and AC2 that makes AC1+AC2 not completely equal to VRECT. In particular, when AC1 is less zero, AC2 will be greater than VRECT, and vice versa. When 0<AC1<VRECT, then 0<AC2<VRECT.

As represented in FIG. 2, one of the two components AC1 and AC2 is applied to a particular input of each comparator 202, while the other comparator input, which functions as a voltage reference, is connected either to the output node VRECT or to the ground node PGND.

Ideally, as soon as the corresponding component AC1 or AC2 crosses its reference voltage in either direction (i.e., going either from below its reference voltage to above its reference voltage or vice versa), an output 203 from the corresponding comparator 202 instantaneously switches from low (i.e., logic 0) to high (i.e., logic 1) or from high to low, depending on the particular direction and the particular comparator. Furthermore, as soon as the output from the comparator 202 changes from low to high or from high to low, ideally, the corresponding FET 204 instantaneously turns on or off, respectively.

Thus, when the component AC1 is greater than VRECT, the output 203(1) from the comparator 202(1) is low, FET 204(1) is off, the output 203(3) from the comparator 202(3) is high, and FET 204(3) is on. As soon as AC1 transitions from greater than VRECT to less than VRECT, the output 203(1) from the comparator 202(1) stays low, FET 204(1) stays off, the output 203(3) from the comparator 202(3) should instantaneously change from high to low, and FET 204(3) should immediately turn off. As soon as AC1 transitions from positive to negative, the output 203(1) from the comparator 202(1) should instantaneously change from low to high, FET 204(1) should immediately turn on, the output 203(3) from the comparator 202(3) should stay low, and FET 204(3) should stay off.

As long as AC1 stays negative, FET 204(1) will be on and FET 204(3) will be off. As soon as AC1 transitions from negative to positive, the output 203(1) from the comparator 202(1) should instantaneously change from high to low, FET 204(1) should immediately turn off, the output 203(3) from the comparator 202(3) should stay low, and FET 204(3) should stay off. As soon as AC1 transitions from less than VRECT to greater than VRECT, the output 203(1) from the comparator 202(1) stays low, FET 204(1) stays off, the output 203(3) from the comparator 202(3) should instantaneously change from low to high, and FET 204(3) should immediately turn on. As long as AC1 stays above VRECT, FET 204(1) will be off and FET 204(3) will be on.

An analogous sequence of the FETs 204(2) and 204(4) turning on and off will occur as the component AC2 cycles in a complementary fashion, such that, ideally, the states of the four FETs 204(1)-204(4) for different values of AC1 and AC2 are given in Table I of FIG. 3. Note that, during ideal operation of the synchronous rectifier 200, current flows only from ground to AC1/AC2 and from AC1/AC2 to VRECT, with the body diodes of the FETs 204 preventing flow in the reverse directions.

In fact, however, there are non-zero delays in real-world implementations of the synchronous rectifier 200. In particular, there is a non-zero delay between the time that an AC component AC1/AC2 crosses a threshold voltage and the time that the corresponding FET 204 turns on or off. These delays adversely affect the operation of the rectifier.

For example, when AC1 transitions from positive to negative and AC2 transitions from below VRECT to above VRECT, there is a non-zero delay in turning on FET 204(1) and a non-zero delay in turning on FET 204(4), while FETs 204(3) and 204(2) remain off. The delay in turning on FET 204(1) results in an undesirable "on" bounce in AC1, and the delay in turning on FET 204(4) results in an undesirable "on" bounce in AC2. The "on" bounces have a negative impact on the overall rectifier efficiency as each bounce is introduced by the intrinsic body diode conducting the current. When AC1 transitions from negative to positive and AC2 transitions from above VRECT to below VRECT, there is a non-zero delay in turning off FET 204(1) and a non-zero delay in turning off FET 204(4), while FETs 204(3) and 204(2) remain off. The delay in turning off FET 204(1) means that FET 204(1) will remain on for a short duration while AC1 is positive, resulting in an undesirable reverse current flowing from AC1 to PGND. The delay in turning off FET 204(4) means that FET 204(4) will remain on for a short duration while AC2 is below VRECT, resulting in an undesirable reverse current flowing from VRECT to AC2.

Similarly, when AC1 transitions from below VRECT to above VRECT and AC2 transitions from positive to negative, there is a non-zero delay in turning on FET 204(3) and a non-zero delay in turning on FET 204(2), while FETs 204(1) and 204(4) remain off. In this case, the delay in turning on FET 204(2) results in an undesirable "on" bounce in AC2, and the delay in turning on FET 204(3) results in an undesirable "on" bounce in AC1. When AC1 transitions from above VRECT to below VRECT and AC2 transitions from negative to positive, there is a non-zero delay in turning off FET 204(3) and a non-zero delay in turning off FET 204(2), while FETs 204(1) and 204(4) remain off. A non-zero delay in turning on FET 204(2) means that FET 204(2) will remain on for a short duration while AC2 is positive, resulting in an undesirable reverse current flowing from AC2 to PGND. A non-zero delay in turning off FET 204(3) means that FET 204(3) will remain on for a short duration while AC1 is below VRECT, resulting in an undesirable reverse current flowing from VRECT to AC1.

FIG. 4 is a timing diagram showing the AC component AC1, the comparator output 203(1) of FIG. 2, and the current $I_1$ flowing through FET 204(1) for the part of the cycle of AC1 going from positive to negative and then from negative to positive. FIG. 4 shows (i) the undesirable "on" bounce 402 that occurs in AC1 when AC1 transitions from positive to negative due to FET 204(1) turning on late (404) and (ii) the undesirable reverse current 406 flowing through FET 204(1) when AC1 transitions from negative to positive due to the FET 204(1) turning off late (408). It would be advantageous have a rectifier with improved efficiency.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale. For example, the thicknesses of layers and regions may be exaggerated for clarity.

FIG. 3 is Table that identifies the states of the four FETs of FIG. 2 for different values of the AC components AC1 and AC2 for an ideal implementation of the synchronous rectifier of FIG. 2;

DETAILED DESCRIPTION

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a", "an", and "the", are intended to include the plural forms as well, unless the context clearly indicates otherwise. It further will be understood that the terms "comprises", "comprising", "has", "having", "includes", or "including" specify the presence of stated features, steps, or components, but do not preclude the presence or addition of one or more other features, steps, or components. It also should be noted that, in some alternative implementations, the functions/acts noted might occur out of the order noted in the figures. For example, two figures shown in succession may in fact be executed substantially concurrently or may sometimes be executed in the reverse order, depending upon the functionality/acts involved. The term "or" is to be interpreted as inclusive unless indicated otherwise.

The present invention provides a synchronous rectifier having four (e.g., FET) switches, wherein each switch is controlled by dedicated switch-control circuitry that takes into account signal processing delays and propagation delays in order to reduce (i) the magnitudes of undesirable "on" bounces that can occur when the switches are turned on late and (ii) the magnitudes of undesirable reverse currents that can occur when the switches are turned off late.

In one embodiment, the present invention is an article of manufacture comprising a synchronous rectifier for converting an AC input having two components AC1 and AC2 into a DC output VRECT. The synchronous rectifier includes four switches and four switch control modules. A first switch is connected between AC1 and ground, a second switch is connected between AC2 and ground, a third switch is connected between AC1 and VRECT, and a fourth switch is connected between AC2 and VRECT. Each switch control module is configured to control a different one of the four switches, and e each switch control module comprises (i) digitally assisted "switch on" circuitry configured to control when to turn on the corresponding switch and (ii) digitally assisted "switch off" circuitry configured to control when to turn off the corresponding switch.

Figure 1:
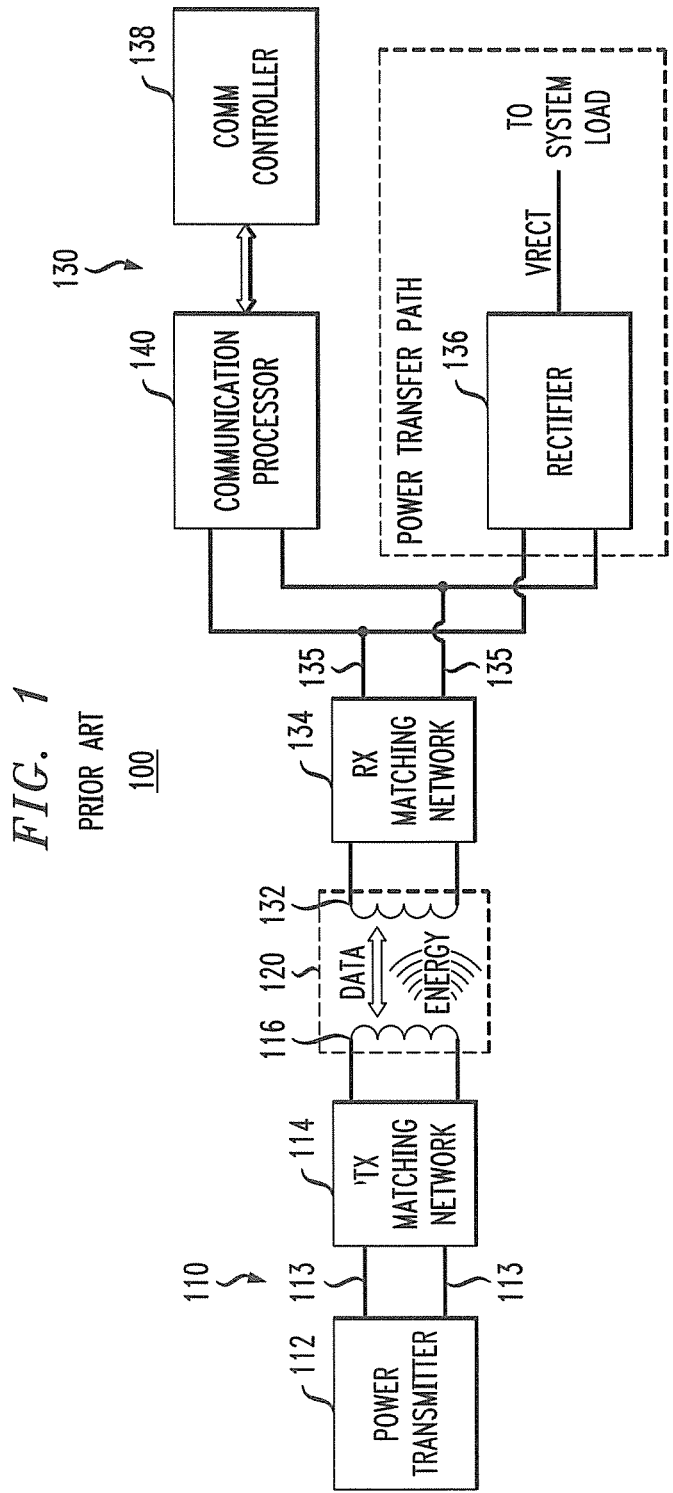
FIG. 1 is a simplified schematic block diagram of a conventional wireless power transfer system.
Figure 2:
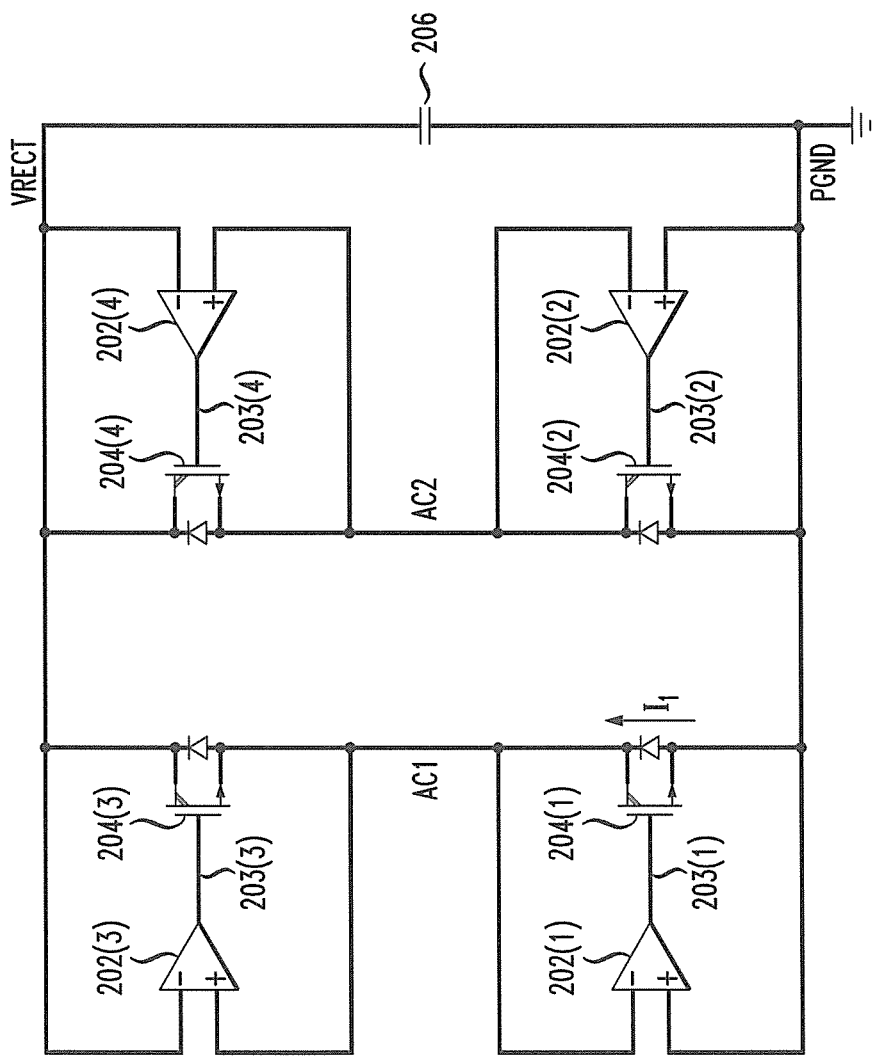
FIG. 2 is a schematic block diagram of a conventional synchronous rectifier that can be used to implement the synchronous rectifier of FIG. 1.
Figure 4:
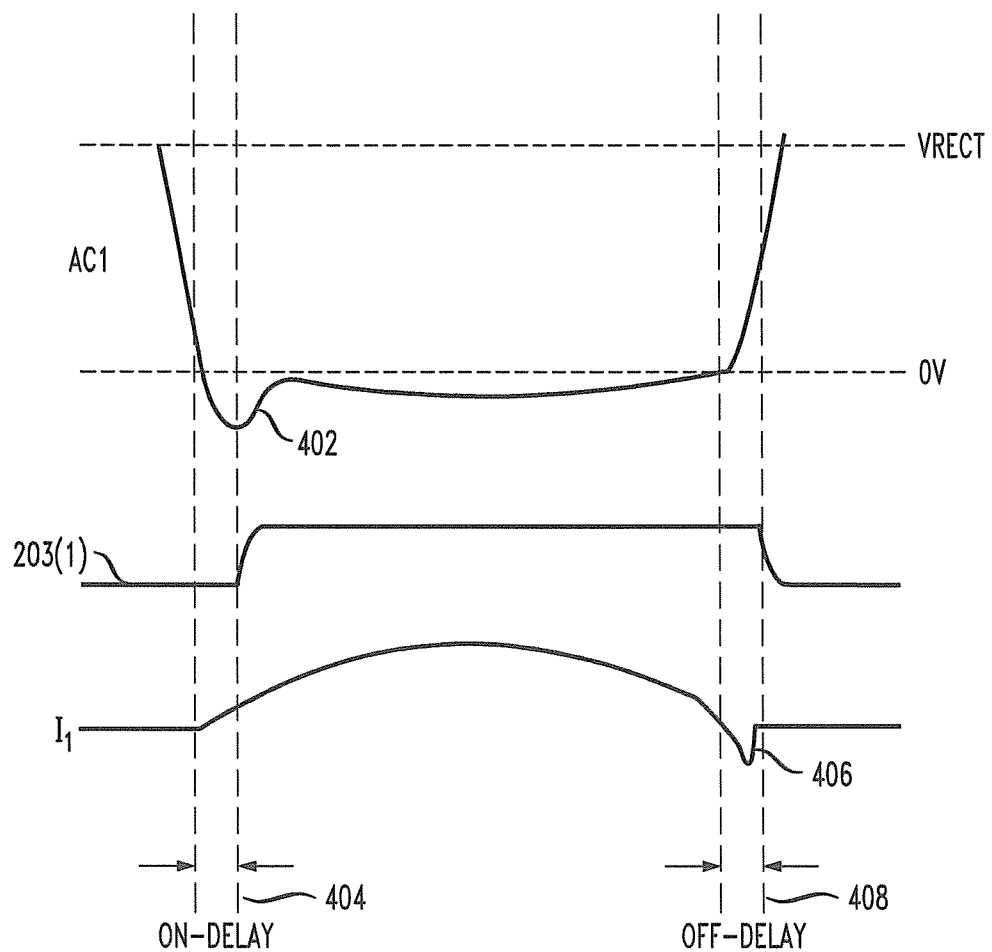
FIG. 4 is a timing diagram showing an undesirable "on" bounce and an undesirable reverse current that occur in a real implementation of the synchronous rectifier of FIG. 2.
Figure 5:
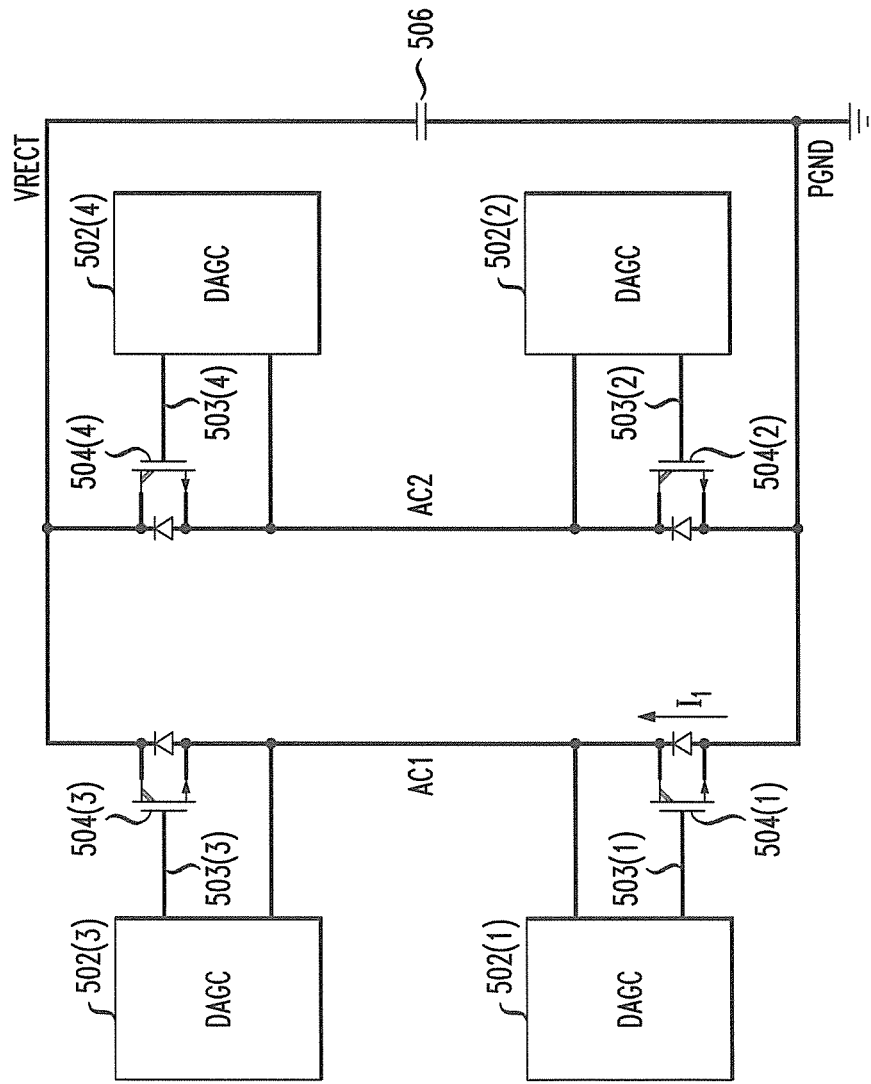
FIG. 5 is a schematic block diagram of a synchronous rectifier that can be used to implement the synchronous rectifier of FIG. 1, according to one embodiment of the present invention.

Referring now to FIG. 5, a schematic block diagram of a synchronous rectifier 500 that can be used to implement the synchronous rectifier 136 of FIG. 1, according to one embodiment of the present invention, is shown. The synchronous rectifier 500 includes four digitally assisted gate control (DAGC) modules 502(1)-502(4) that control four n-type FET switches 504(1)-504(4) having respective intrinsic diodes. The first and third switches 504(1) and 504(3) are connected in series between an output node VRECT and ground (PGND). The second and fourth switches 504(2) and 504(4) similarly are connected in series between the output node VRECT and ground PGND. A capacitor 506, which functions as a low-pass filter for the synchronous rectifier 500, also is connected between the output node VRECT and ground (PGND). The first and third switches 504(1) and 504(3) are connected in parallel with the second and fourth switches 504(2) and 504(4), and the capacitor 506 is connected in parallel with the second and fourth switches 504(2) and 504(4).

Each DAGC module 502 has an input and an output. The AC signal that is applied to the synchronous rectifier 500 has two complementary components AC1 and AC2. When the AC signal has zero offset, the amplitude of AC1 is the negative of the amplitude of AC2. One of the two components AC1 and AC2 is applied to the input of each DAGC module 502. In particular, the first component AC1 is input to the first and third DAGC modules 502(1) and 502(3), while the second component AC2 is input to the second and fourth DAGC modules 502(2) and 502(4). In response, each DAGC module 502 generates a gate control signal 503(1)-503(4) that is applied to the gate of the respective nFET switch 504(1)-504(4).

Figure 6:
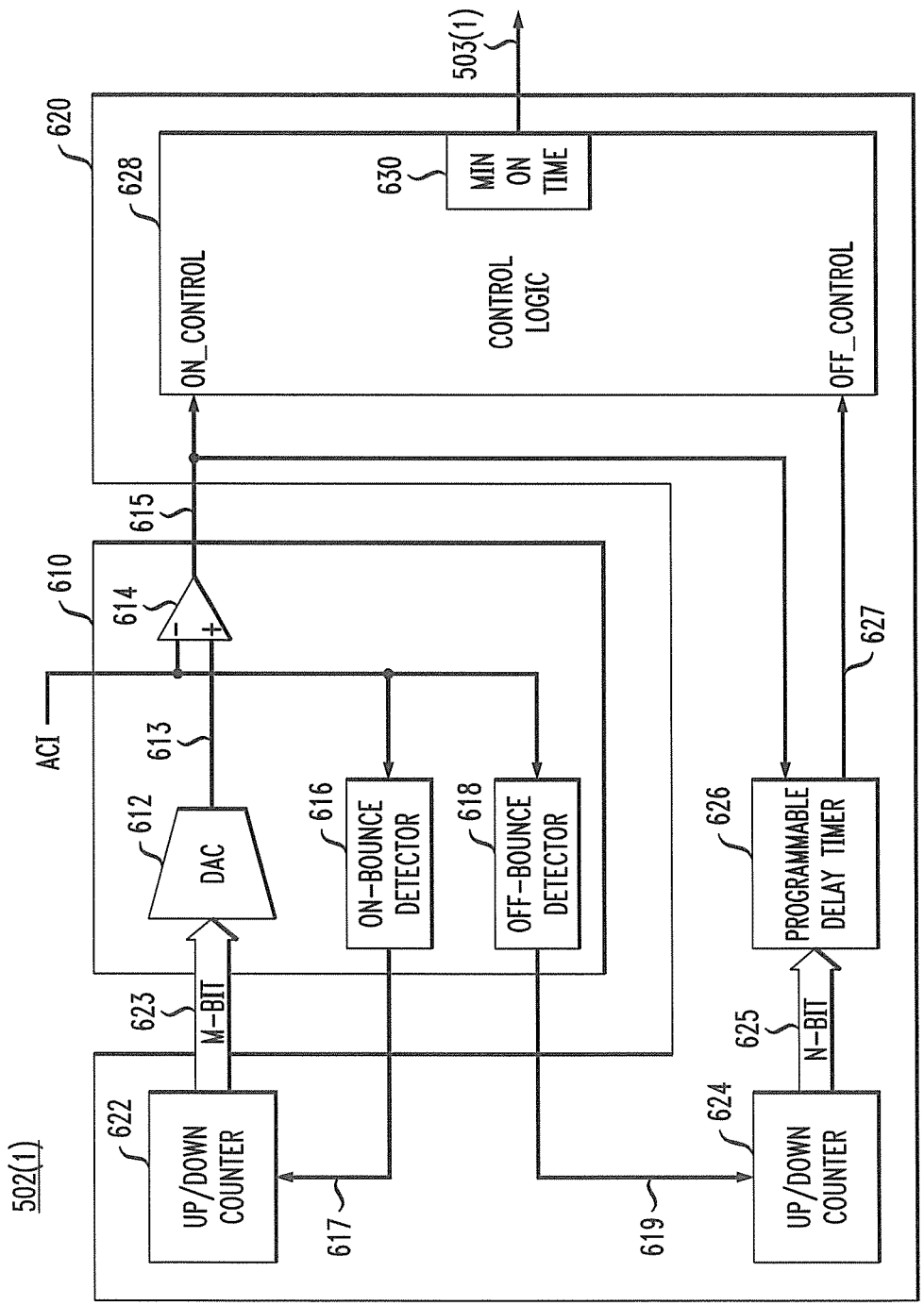
FIG. 6 is a schematic block diagram of a DAGC module of FIG. 5 for generating a gate control signal used to control a FET 504(1) of the rectifier of FIG. 5, in accordance with an embodiment of the present invention.

FIG. 6 is a schematic block diagram of the DAGC module 502(1) that generates the gate control signal 503(1) used to control the FET 504(1). The DAGC module 502(1) has (i) an analog part 610 comprising digital-to-analog converter (DAC) 612, comparator 614, on-bounce detector 616, and off-bounce detector 618 and (ii) a digital part 620 comprising two up/down counters 622 and 624, programmable delay cell 626, and control logic 628 having minimum on-time cell 630, which sets a minimum duration for which the FET 504(1) will remain on each time the FET 504(1) is turned on.

The three other DAGC modules 502(2)-502(4) have similar architectures as the DAGC module 502(1) of FIG. 6, but are configured differently. As shown in FIG. 6, the AC component AC1 is applied to the negative input of the comparator 614, and an analog output 613 from the DAC 612 is applied to the positive input of the comparator 614. For the DAGC module 502(2), the AC component AC2 would be applied to the corresponding comparator's negative input, and the output from the corresponding DAC would be applied to the comparator's positive input. For the DAGC module 502(3), the AC component AC1 would be applied to the corresponding comparator's positive input, and the output from the corresponding DAC would be applied to the comparator's negative input. Lastly, for the DAGC module 502(4), the AC component AC2 would be applied to the corresponding comparator's positive input, and the output from the corresponding DAC would be applied to the comparator's negative input. Otherwise, the structure and the operations of other three DAGC modules 502(2)-502(4) are analogous to those described below for the DAGC module 502(1) of FIG. 6.

The AC component AC1 also is input to the on-bounce detector 616 and the off-bounce detector 618. The on-bounce detector 616 detects occurrences of "on" bounces in the AC component AC1. When AC1 goes negative, current will flow from ground PGND to AC1 through the body diode of the FET 504(1) until the FET 504(1) is turned on. When the FET 504(1) is ON, AC1 will go back close to ground PGND. As a result, there is an undershoot in AC1 during the period between AC1 going negative and the FET 504(1) turning on. This undershoot is referred to as an "on" bounce. Every time the on-bounce detector 616 detects an "on" bounce at the beginning of a cycle in the AC component AC1, the on-bounce detector 616 generates a pulse 617 that instructs the up/down counter 622 to increment by one. If an "on" bounce is not detected during a given cycle, then the up/down counter 622 decrements by one. The up/down counter 622 generates an M-bit count value 623.

The M-bit counter value 623 is input to the DAC 612, which generates the corresponding analog output signal 613 that is applied to the positive input of the comparator 614. The comparator 614 compares the analog signal 613 to the AC component AC1 to generate a comparator output signal 615, which is applied as an on-control signal to the control logic 628. As described in further detail below in conjunction with FIG. 10, when the on-control signal 615 goes high, the control logic 628 drives the gate control signal 503(1) high to turn on the FET 504(1).

Each increment of the counter value 623 corresponds to a specific increment in voltage level. Since the "on" bounces detected in AC1 by the DAGC module 502(1) correspond to situations in which there is a delay in turning on the FET 504(1) after AC1 goes from positive to negative, every time the counter value 623 is incremented, the output 615 of the comparator 614 will transition from low to high a little sooner in the next cycle, thereby turning on the FET 504(1) a little sooner in the next cycle.

As the counter value 623 continues to be incremented, eventually the comparator output 615 will transition from low to high at a time when there is little or no delay in turning on the FET 504(1). In that case, little or no "on" bounce will be generated during that cycle, and the on-bounce detector 616 will not detect an "on" bounce for that cycle. As such, the up/down counter 622 will decrement its counter value 623 by one, thereby causing the FET 504(1) to turn on a little later in the next cycle. By incrementing and decrementing the counter value 623 as needed, the DAGC module 502(1) will ensure that the FET 504(1) is turned on at times in which there are acceptably small if any "on" bounces.

In parallel with that processing, the off-bounce detector 618 detects occurrences of "off" bounces in the AC component AC1. When the programmable delay cell 626 expires and causes the FET 504(1) to turn off before AC1 goes from negative to positive, AC1 will go even more negative since current conducts from ground PGND to AC1 through the body diode of the FET 504(1) until AC1 goes positive. AC1 is negative but very close to the PGND when the FET 504(1) is closed. When the delay expires, since AC1 is still negative and current must be conducted through the body diode, the voltage difference between PGND and AC1 will become larger since the voltage drop across the FET diode is bigger than the voltage drop across the closed FET 504(1). Therefore, AC1 will go negative even when the FET 504(1) is open while AC1 is still negative. This undershoot during the period after the FET 504(1) turns off, but before AC1 goes positive is referred to as an "off" bounce. Every time the off-bounce detector 618 detects an "off" bounce at the end of a cycle in the AC component AC1, the off-bounce detector 618 generates a pulse 619 that instructs the up/down counter 624 to increment its counter value 625 by one. If an "off" bounce is not detected during a given cycle, then the up/down counter 624 decrements its counter value 625 by one.

The up/down counter 624 applies its N-bit counter value 625 to the programmable delay cell 626. As soon as the on-control signal 615 goes high, the programmable delay cell 626 starts a count-down timer starting at the counter value 625 and decrementing each cycle. As soon as the count-down timer expires, the programmable delay cell 626 drives the delay output signal 627 high. The delay output signal 627 is applied as an off-control signal to the control logic 628. As described in further detail below in conjunction with FIG. 10, when the off-control signal 627 goes high, the control logic 628 drives the gate control signal 503(1) low to turn off the FET 504(1) as long as the off-control signal 627 goes high more than the minimum duration specified by the "min on time" cell 630 after the on-control signal 615 went high. If the off-control signal 627 goes high before that minimum duration has passed, then the control logic 628 will delay driving the gate control signal 503(1) low until just after that minimum duration has passed.

Each increment of the counter value 625 corresponds to a specific increment in time. By purposely setting the initial counter value 625 to be sufficiently small (e.g., one more than the value equivalent to the minimum on time set by cell 630), the programmable delay cell 626 will initially ensure that the FET 504(1) is turned off early, thereby artificially inducing an "off" bounce in AC1. Every time the counter value 625 is incremented, the output 627 of the programmable delay cell 626 will transition from low to high a little later in the next cycle, thereby turning off the FET 504(1) a little later in the next cycle.

As the counter value 625 continues to be incremented, eventually the delay output 627 will transition from low to high at a time when the FET 504(1) is not turned off early. In that case, little or no "off" bounce will be generated during that cycle. As such, the up/down counter 624 will decrement its counter value 625 by one, thereby causing the FET 504(1) to turn off a little sooner. By incrementing and decrementing the counter value 625, the DAGC module 502(1) ensures that the FET 504(1) is turned off when there are acceptably small if any "off" bounces.

The DAGC module 502(1) can be tuned by initializing both of the counter values 623 and 625 to sufficiently low values that ensure the existence of both "on" and "off" bounces in AC1 respectively due to the FET 504(1) turning on late and turning off early. As such, both counter values 623 and 625 will initially be incremented at each cycle, which will cause the FET 504(1) to be turned on a little earlier and off a little later. The counter value 623 will reach its tuned level before the counter value 625 reaches its tuned level. Eventually both values will be tuned, and the DAGC module 502(1) will operate with minimal if any "on" and "off" bounces and little if any reverse current flow.

Figure 7:
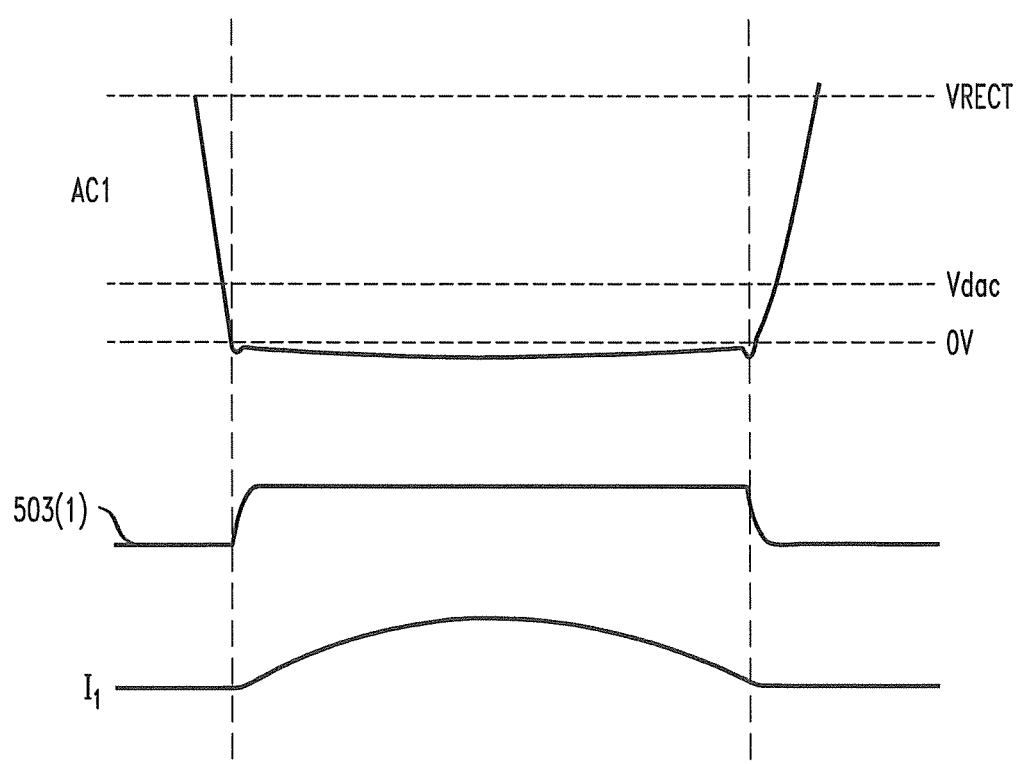
FIG. 7 is a timing diagram showing the AC component AC1 and a gate control signal of FIG. 5, and the current $I_1$ flowing through a FET for a part of a cycle of AC1, after the DAGC module of FIG. 6 has been tuned.

FIG. 7 is a timing diagram showing the AC component AC1, the gate control signal 503(1), and the current $I_1$ flowing through the FET 504(1) for a part of a cycle of AC1 going from positive to negative and then from negative to positive, after the DAGC module 502(1) has been tuned. As shown in FIG. 7, there is little delay in the rise of the gate control signal 503(1) following AC1 going from positive to negative and, as a result, there is a sufficiently small "on" bounce in AC1. Similarly, the fall of the gate control signal 503(1) will slightly precede AC1 going from negative to positive and, as a result, there is a sufficiently small "off" bounce in AC1 and no reverse current in $I_1$.

The DAGC module 502(1) may be said to include (i) digitally assisted "switch on" circuitry that determines when to turn on the FET 504(1) and (ii) digitally assisted "switch off" circuitry that determines when to turn off the FET 504(1), where the "switch on" circuitry includes the on-bounce detector 616, the up/down counter 622, the DAC 612, the comparator 614, and the portion of the control logic 628 that turns on the FET 504(1), while the "switch off" circuitry includes the off-bounce detector 618, the up/down counter 624, the programmable delay cell 626, and the portion of the control logic 628 that turns off the FET 504(1), including the "min on time" cell 630.

Figure 8:
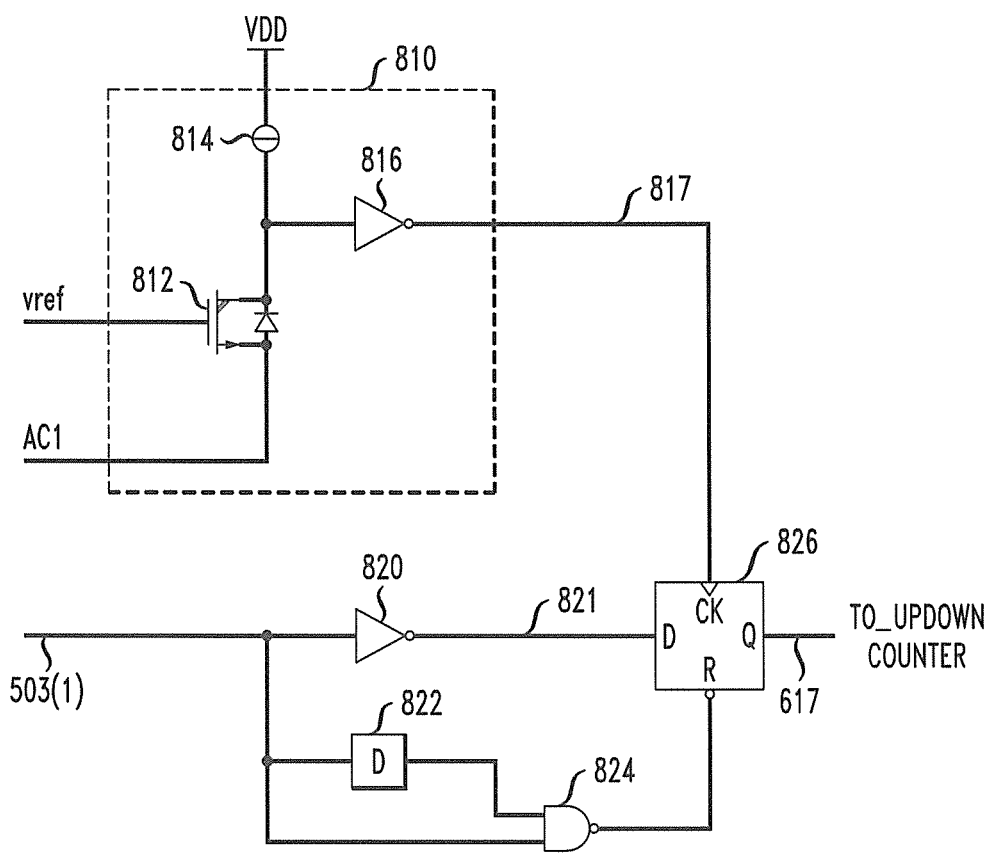
FIG. 8 is a schematic circuit diagram of the on-bounce detector of the DAGC module of FIG. 6.

FIG. 8 is a schematic circuit diagram of the on-bounce detector 616 of FIG. 6. The on-bounce detector 616 comprises n-type FET 812, ideal current source 814, inverters 816 and 820, delay cell 822, NAND gate 824, and flip-flop 826, where the FET 812, the ideal current source 814, and the inverter 816 form a comparator 810 that compares AC1 to a reference voltage vref (e.g., 0.1V). When AC1 goes negative (before the FET 504(1) is turned on), the comparator 810 will generate a "HIGH" signal 817, which will toggle the flip-flop 826 to output the signal 821 at its input port D as the signal 617 at its output port Q. Since the gate control signal 503(1) stays low due to the delay in turning on the FET 504(1), the inverter 820 will keep the input signal 821 of the flip-flop 826 high until the FET 504(1) is turned on. Therefore, a "1" is applied to the up/down counter 622 when the flip-flop 826 is clocked by the comparator 810. In this way, an "on" bounce is detected. When the gate control signal 503(1) goes high, the flip-flop 826 is reset and its output will be "0" again for the next cycle's "on" bounce detection. The delay cell 822, which applies a several nanosecond delay, and the NAND gate 824 ensure that the pulse width at the output Q of the flip-flop 826 is long enough to enable the output pulse 617 to be successfully sampled by the up/down counter 622, thereby causing the up/down counter 622 to increment its counter value 623. When there is no delay in turning on the FET 504(1), AC1 will not go negative enough before the gate control signal 503(1) goes high. In that case, either by the time the flip-flop 826 is clocked by the comparator output signal 817 going high, the signal 821 applied to the flip-flop's D input will already be low, or the flip-flop 826 is never clocked as the comparator 810 output always stays low and therefore no pulse will be applied to the up/down counter 622, thereby causing the up/down counter 622 to decrement its counter value 623.

Figure 9:
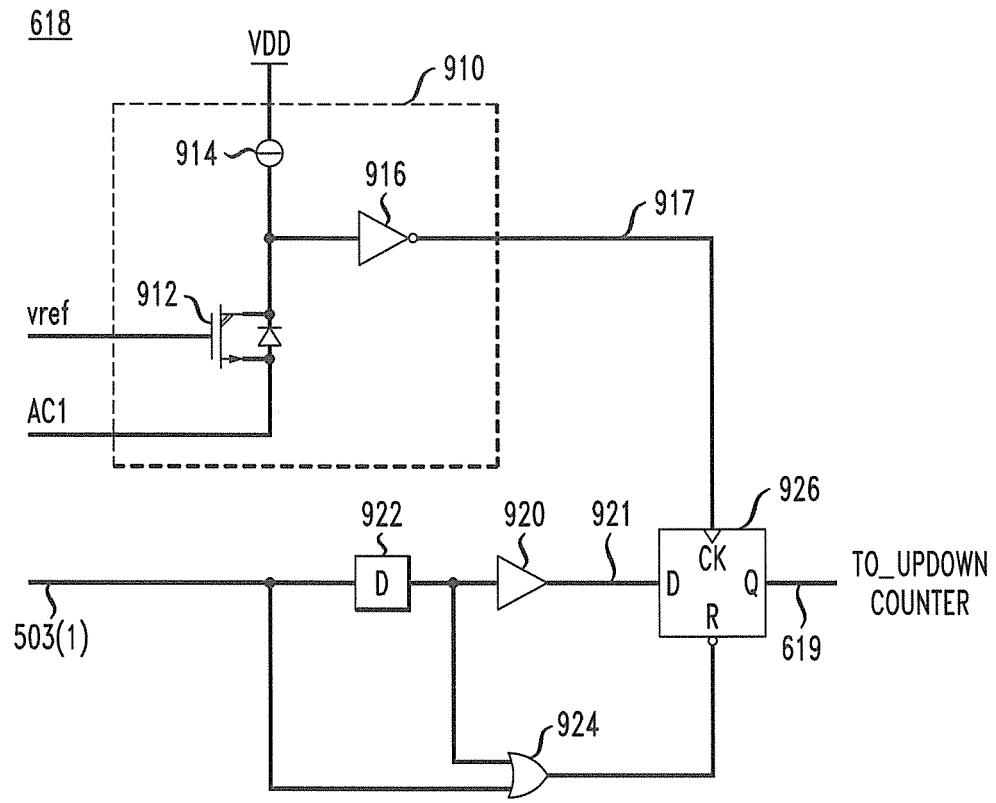
FIG. 9 is a schematic circuit diagram of the off-bounce detector of the DAGC module of FIG. 6.

FIG. 9 is a schematic circuit diagram of the off-bounce detector 618 of FIG. 6. The off-bounce detector 618 comprises n-type FET 912, ideal current source 914, inverter 916, buffer 920, delay cell 922, OR gate 924, and flip-flop 926, where the FET 912, the ideal current source 914, and the inverter 916 form a comparator 910 that compares AC1 to a reference voltage Vref (e.g., 0.1V). When the programmable delay cell 626 of FIG. 6 expires before AC1 goes positive, the FET 504(1) is turned off, AC1 goes more negative, and the comparator 910 will generate a "HIGH" signal 917, which will toggle the flip-flop 926 to output the signal 921 at its input port D as the signal 619 at its output port Q. Although the gate control signal 503(1) goes low, in turning off the FET 504(1), the input signal 921 of the flip-flop 926 after being buffered through the buffer 920 remains high until the delay 922 expires. Therefore, a "1" is applied to the up/down counter 624 of FIG. 6 when the flip-flop 926 is clocked by the comparator 910. In this way, an "off" bounce is detected. When the gate control signal 503(1) goes low, the flip-flop 926 is reset after the delay 922 expires and its output will be "0" again for the next cycle's "off" bounce detection. The delay cell 922, which applies a several nanosecond delay, and the OR gate 924 ensure that the pulse width at the output Q of the flip-flop 926 is long enough to enable the output pulse 619 to be successfully sampled by the up/down counter 624, thereby causing the up/down counter 624 to increment its counter value 625. Since the programmable delay 626 turns off the FET 504(1) accurately at the time that AC1 is a little lower than PGND or even goes a little higher than PGND, the comparator output signal 917 will never go high. In that case, the flip-flop 926 is not clocked by the comparator output signal 917, the flip-flop's output will always be low, and no pulse will be applied to the up/down counter 624, thereby causing the up/down counter 624 to decrement its counter value 625.

Figure 10:
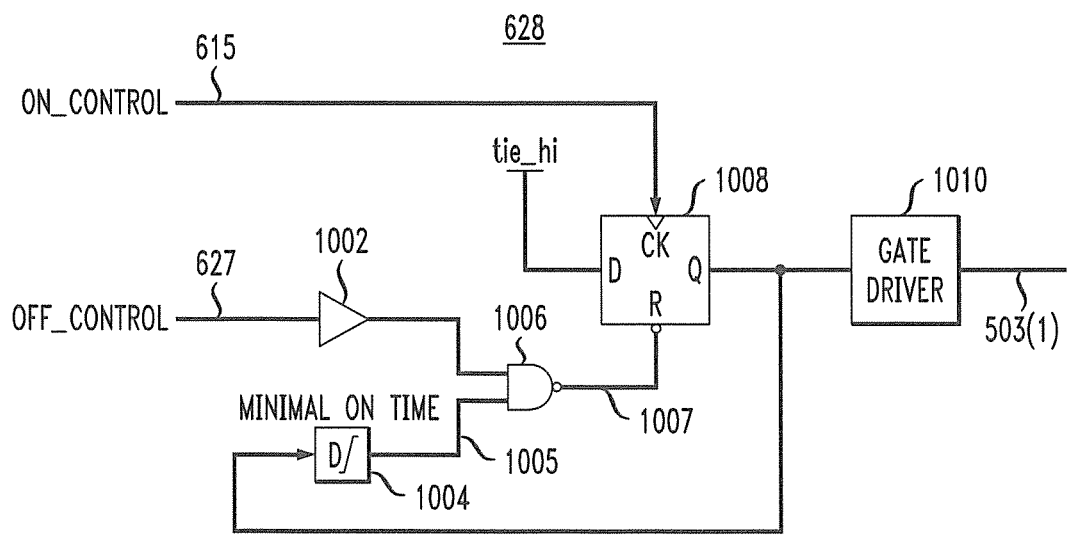
FIG. 10 is a simplified schematic diagram of the control logic of the DAGC module of FIG. 6.

FIG. 10 is a simplified schematic diagram of the control logic 628 of FIG. 6. The control logic 628 comprises buffer 1002, "min on time" delay cell 1004, NAND gate 1006, flip-flop 1008, and FET gate driver 1010. When the on-control signal (i.e., the comparator output 615) goes high, the flip-flop 1008 passes a constant high signal tie_hi applied at its D input to its Q output, thereby driving the gate control signal 503(1) high to turn on the FET 504(1).

When the gate control signal 503(1) goes high, the "min on time" delay cell 1004 starts to decrement its counter value (which is initialized based on the minimum on time) by one each cycle. The output 1005 from the delay cell 1004 remains low until the counter value reaches zero, at which time the delay output 1005 goes high. Meanwhile, when the off-control signal (i.e., the programmable delay output 627) goes high, the output of the buffer 1002 goes high, the output 1007 of the NAND gate 1006 goes low to reset the flip-flop 1008 so that the gate driver 1010 drives the gate control signal 503(1) low to turn off the FET 504(1).

When either or both of the inputs to the NAND gate 1006 are low, the NAND gate output 1007 is high, and the flip-flop 1008 is not reset. When both inputs to the NAND gate 1006 are high, the NAND gate output 1007 goes low, and the flip-flop 1008 is reset, thereby driving the gate control signal 503(1) low to turn off the FET 504(1).

Those skilled in the art will understand that the three other DAGC modules 502(2)-502(4) will have on-bounce detectors, off-bounce detectors, and control logic circuits having architectures similar to those shown in FIGS. 8-10, respectively, but configured differently. In particular, while the "on" and off-bounce detectors for the DAGC module 502(2) will receive the AC component AC1, the "on" and off-bounce detectors for the DAGC modules 502(3) and 502(4) will receive the AC component AC2. Furthermore, while the reference voltage Vref for the "on" and off-bounce detectors for the DAGC module 502(2) will be slightly above ground PGND (e.g., 0.1V), the reference voltage Vref for the "on" and off-bounce detectors for the DAGC modules 502(3) and 502(4) will be slightly below VRECT (e.g., VRECT−0.1V).

The invention has been described in the context of the DAGC modules 502(1)-502(4) having up/down counters (e.g., 622 and 624 of FIG. 6) that (i) increment their counter values by one when an "on"/"off" bounce is detected and (ii) decrement their counter values by one when no bounce is detected. Those skilled in the art will understand that there are alternative schemes for incrementing and decrementing these counter values, either while the DAGC modules 502 are being tuned or after the DAGC modules 502 have been tuned or both. For example, the counter values could be incremented by two whenever an "on"/"off" bounce is detected and decremented by one whenever a bounce is not detected. Such a scheme could result in both faster tuning and even smaller average "on" and "off" bounces after tuning.

The invention has been described in the context of the synchronous rectifier 500 having the DAGC modules 502(1)-502(4) having digitally assisted comparators (e.g., 614 of FIG. 6) to determine when to turn on the corresponding FETs 504(1)-504(4) and digitally assisted programmable delay cells (e.g., 626 of FIG. 6) to determine when to turn off the corresponding FETs 504(1)-504(4). Other implementations are also possible. For example, digitally assisted comparators could be used to determine when to turn off the FETs and digitally assisted programmable delay cells could be used to determine when to turn on the FETs. Alternatively, a first set of digitally assisted comparators could be used to determine when to turn on the FETs and a second set of digitally assisted comparators could be used to determine when to turn off the FETs.

Although the invention has been described in the context of synchronous rectifiers having FETs as switches, those skilled in the art will understand that other suitable types of devices can be used to implement the switches.

Although the invention has been described in the context of synchronous rectifiers for use in wireless power transfer systems, those skilled in the art will understand that synchronous rectifiers of the present invention can be used in any other suitable application.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A synchronous rectifier for converting an AC input having two components AC1 and AC2 into a DC output VRECT, the synchronous rectifier comprising:
   four switches including,
   a first switch configured to be coupled between the AC1 and a ground;
   a second switch configured to be coupled between the AC2 and the ground;
   a third switch configured to be coupled between the AC1 and the VRECT; and
   a fourth switch configured to be coupled between the AC2 and the VRECT; and four switch control modules, each configured to control a corresponding one of the four switches, wherein each switch control module includes,
switch on circuitry that controls when to turn on the corresponding switch; and
an on-bounce detector configured to detect on bounces in the corresponding AC component; and wherein the switch on circuitry is configured to turn on the corresponding switch sooner if the on-bounce detector detects an on bounce.

2. The rectifier of claim 1, wherein the switch on circuitry includes:
a first up/down counter configured to increment a first counter value when the on-bounce detector detects an on bounce and decrement the first counter value when the on-bounce detector does not detect an on bounce;
a digital-to-analog converter (DAC) configured to convert the first counter value to an analog reference signal; and
a comparator configured to compare the corresponding AC component to the analog reference signal to generate an on control signal used to turn on the corresponding switch.

3. The rectifier of claim 2,
wherein incrementing the first counter value results in the switch on circuitry turning the corresponding switch on when there are small if any on bounces in the AC input.

4. The rectifier of claim 1,
wherein each switch control module includes switch off circuitry that controls when to turn off the corresponding switch;
wherein the switch off circuitry comprises:
an off-bounce detector configured to detect off bounces in the corresponding AC component;
an up/down counter that increments a counter value when the off-bounce detector detects an off bounce and decrements the counter value when the off-bounce detector does not detect an off bounce; and
a programmable delay cell that uses the second counter value to delay generation of an off-control signal used to turn off the corresponding switch.

5. The rectifier of claim 4,
wherein incrementing the second counter value results in the switch off circuitry turning the corresponding switch off later.

6. The rectifier of claim 4,
wherein the switch off circuitry delays turning off the corresponding switch based on a minimum on time duration independent of the second counter value.

7. The rectifier of claim 1,
wherein each switch comprises a n-FET with an intrinsic diode.

8. The rectifier of claim 7,
wherein each switch control module generates a gate control signal that is applied to the gate of a corresponding one of the n-FETs.

9. The rectifier of claim 8,
further comprising a low pass filter connected between the DC output VRECT and ground.

10. The article rectifier of claim 9,
wherein the low pass filter comprises a capacitor.

11. The rectifier of claim 1, wherein:
the rectifier is embedded in a power receiver (RX) configured to be coupled to a wireless charging system that includes a power transmitter (TX).

12. A synchronous rectifier for converting an AC input having two components AC1 and AC2 into a DC output VRECT, the synchronous rectifier comprising:
four switches including,
a first switch configured to be coupled between the AC1 and a ground;
a second switch configured to be coupled between the AC2 and the ground;
a third switch configured to be coupled between the AC1 and the VRECT; and
a fourth switch configured to be coupled between the AC2 and the VRECT; and
four switch control modules, each configured to control a corresponding one of the four switches,
wherein each switch control module includes,
switch on circuitry that controls when to turn on the corresponding switch; and
switch off circuitry that controls when to turn off the corresponding switch;
wherein the switch on circuitry includes,
an on-bounce detector configured to detect on bounces in the corresponding AC component;
a first up/down counter that increments a first counter value when the on-bounce detector detects an on bounce and decrements the first counter value when the on-bounce detector does not detect an on bounce;
a digital-to-analog converter (DAC) that converts the first counter value to an analog reference signal; and
a comparator that compares the corresponding AC component to the analog reference signal to generate an on control signal used to turn on the corresponding switch.

13. A synchronous rectifier for converting an AC input having two components AC1 and AC2 into a DC output VRECT, the synchronous rectifier comprising:
four switches including,
a first switch configured to be coupled between the AC1 and a ground;
a second switch configured to be coupled between the AC2 and the ground;
a third switch configured to be coupled between the AC1 and the VRECT; and
a fourth switch configured to be coupled between the AC2 and the VRECT; and
four switch control modules, each configured to control a corresponding one of the four switches,
wherein each switch control module includes,
switch off circuitry that controls when to turn off the corresponding switch; and
an off-bounce detector configured to detect off bounces in the corresponding AC component; and
wherein the switch off circuitry is configured to turn off the corresponding switch later if the off-bounce detector detects an off bounce.

* * * * *